United States Patent [19]

Klein

[11] 4,050,897

[45] Sept. 27, 1977

[54] REACTOR APPARATUS

[75] Inventor: Max Klein, Tinton Falls, N.J.

[73] Assignee: Normac, Inc., Tinton Falls, N.J.

[21] Appl. No.: 709,249

[22] Filed: July 27, 1976

Related U.S. Application Data

[60] Division of Ser. No. 266,469, June 26, 1972, which is a continuation-in-part of Ser. No. 814,879, March 19, 1969, abandoned, which is a continuation-in-part of Ser. No. 601,148, Dec. 12, 1966, abandoned, which is a continuation-in-part of Ser. No. 460,187, June 1, 1965, abandoned.

[51] Int. Cl.² .................. B01J 1/00; B08B 13/00; C08F 2/00
[52] U.S. Cl. .................. 23/252 R; 23/286; 23/290; 23/284; 23/288 K; 165/86; 165/88; 165/89; 165/90; 241/65; 241/67; 241/170; 241/176; 241/178; 202/218
[58] Field of Search ............... 23/286, 290, 284, 269, 23/252 R; 165/86, 88, 89, 90; 241/65, 67, 170, 176, 178; 202/218

[56] References Cited

U.S. PATENT DOCUMENTS

| 155,836 | 10/1874 | Ladd | 165/88 |
|---|---|---|---|
| 503,558 | 8/1893 | Solvay | 202/218 UX |
| 1,879,479 | 9/1932 | Punnett | 23/286 |
| 2,919,116 | 12/1959 | Fischer | 165/86 |

Primary Examiner—James H. Tayman, Jr.
Attorney, Agent, or Firm—A. A. Orlinger

[57] ABSTRACT

An apparatus that comprises (a) a fluid-tightly closeable materials-treating or reaction chamber with at least its body portion substantially completely enclosed by a temperature-control fluid chamber provided by its being surrounded by a temperature-control fluid jacket, (b) means to rotate the jacketed chamber end over end about an axis substantially normally transverse to its central axis, (c) divider-baffling means dividing its temperature-control fluid chamber into a plurality of, such as four, substantially similar and independent control-fluid compartments or quadrants, (d) temperature-control fluid ingress means which enable feeding temperature-control fluid into such quadrant while the reactor is rotating, (e) means in each compartment or quadrant to affect the flow of fluids through it to provide substantially uniform overall heat transfer from each of them; and (f) fluid egress means to enable discharging heat-control fluid from these compartments during the rotation.

13 Claims, 9 Drawing Figures

REACTOR APPARATUS

This application is a division of my copending application Ser. No. 266,469 filed June 26, 1972 which is a continuation-in-part of my then copending application Ser. No. 814,879 filed Mar. 19, 1969 (now abandoned), which in turn was a continuation-in-part of my then pending application Ser. No. 601,148 filed Dec. 12, 1966 (now abandoned), which latter application in turn was a continuation-in-part of my then pending with it application Ser. No. 460,187 filed June 1, 1965 (now abandoned).

This invention is that of a materials-treating apparatus applicable as a temperature-controllable reactor, such as a pressure reactor as an autoclave, rotatable end over end about an axis normally transverse to its central axis and generally about midway of its ends. This apparatus is equipped with heat-control (i.e. heating or cooling) means for providing substantially overall uniform temperature through the treating chamber walls into its interior, and can include means enabling charging fluid material into the interior during operation.

This apparatus enables conducting under selected temperature conditions and with agitation a chemical operation that has to be carried out with agitation under such temperature conditions.

The treating apparatus or reactor of the invention can serve also as an end over end rotatable ball mill with or without pressure application and similarly as to heating or cooling control and/or fluid material during operation charging means, and having exceptional advantages over former ball mills rotatable about the central axis.

An important feature of the invention is its steady provision of uniform overall temperature throughout its end over end rotation during its operation.

Another feature of the apparatus of the invention is its avoidance of undesirable gas or vapor lock development in the heat-control means, with otherwise would prevent the provision of uniform temperature.

A further feature of the apparatus is that in its use as a pressure reactor or autoclave, its end over end rotation provides the necessary agitation thereby eliminating the need not only for an internal shaft-driven agitator but also for a stuffing-box where such shaft enters an autoclave. Such stuffing-box has been a source of serious disadvantages because of its wear, leakage, maintenance and replacement cost, and limitation of the applicable pressures.

Still another feature of one embodiment of the apparatus is its inclusion of means to enable feeding or, and even also, withdrawing liquid or other fluid materials into the reactor while it is rotating and even under superatmospheric internal pressure.

Other features of the invention will be seen from its further description below.

Broadly considered, the apparatus of the invention comprises (a) a fluid-tightly closeable materials-treating or reaction chamber with at least its body portion substantially completely enclosed by a temperature-control fluid chamber provided by its being surrounded by a temperature-control fluid jacket, (b) means to rotate the jacketed chamber end over end about an axis substantially normally transverse to its central axis, (c) divider-baffling means dividing its temperature-control fluid chamber into a plurality of, such as four, substantially similar and independent control-fluid compartments or quadrants, (d) temperature-control fluid ingress means which enable feeding temperature-control fluid into such quadrant while the reactor is rotating, (e) means in each compartment or quadrant to affect the flow of fluids through it to provide substantially uniform overall heat transfer from each of them; and (f) fluid egress means to enable discharging heat-control fluid from these compartments during the rotation.

The apparatus of the invention can be understood more readily from the following detailed description of certain embodiments of it, with reference to the accompanying drawings, wherein.

The rotating materials-treating apparatus 10, e.g., reactor-autoclave or ball mill, of the invention, has (as FIGS. 1-3 and 6 show) its treating zone or reaction chamber 11 enclosed by the inner shell or cylindrical reaction chamber wall 12 with one outer end (upper as in FIGS. 1 and 3) tightly fitted into the inner circular wall of the circular opening of upper collar 14. The other end (lower as in the drawings) similarly is tightly fitted into the circular wall of the circular opening in lower collar 16.

The reaction chamber is pressure-tightly closed by the upper cap 17 removably secured to the outwardly extending annular flange 18 of collar 14 by tightly securing means such as a sufficient number, e.g. 24, of securing bolts 19 extending through equally spaced apart bolt holes in cap 17 and with their threaded ends tightly engaged in registry with the inner threads of correspondingly located bolt holes in flange 18.

The lower end of chamber 11 similarly is closed off by corresponding lower cap 21 similarly secured to outwardly extending annular flange 22 of lower collar 16 by a corresponding series of bolts 23 extending through bolt holes 24 in cap 21, with their threaded outer ends tightly engaged in registry with the inner threads of the corresponding bolt holes 25 in flange 22.

Wall 12 of treating zone 11 is encircled by a temperature-control fluid chamber 27 enclosed between that wall and temperature-control fluid chamber outer wall 28. The inner surfaces of the outer ends of wall 28, are pressure-tightly fitted over respectively the outer peripheral surface of annularly depending skirt 29 of collar 14 and the corresponding peripheral surface of upwardly extending annular skirt 31 of lower collar 16. Those outer ends of wall 28 are fluid-tightly sealed by suitable means such as welding the circular part of each of them to the corresponding peripheral surface of each of skirt 29 and skirt 31.

To enable rotating the reactor-autoclave or ball mill end over end, apparatus 10 (of FIGS. 1–6) is supported from bearings by sleeves about two rotatable diametrically opposed parts of a shaft 33 positioned with its axis of rotation running through the apparatus in a line substantially normally transversely to intersect the central axis.

Each of these two separate parts 34 and 35 (FIG. 1) of shaft 33 has its inner and integrally attached (as by welding) to diametrically opposed locations longitudinally about midway along wall 12 of reaction chamber 11. Each such shaft part is enclosed in and spaced away from its own respective temperature-control fluid sleeve 37 and 38 communicating with temperature-control fluid chamber 27. The outer end of each of these shaft-part sleeves or sleeve-jackets is liquid-tightly sealed off by its respective end or closure cap 39 and 40 with the outer end of each of shaft parts 34 and 35 respectively protruding in fluid-tight relationship (as by welding around their junction) through its respective cap. The inner end of each sleeve is integrally attached (as by welding) to jacket outer wall 28.

Temperature-control fluid inlet 42 of stationary T-fitting 43 is mounted between two rotary unions 44 and 45 in shaft-part sleeve-jacket 37. Union 44 pressure-tightly communicates between the T-fitting and the sealed off end of sleeve-jacket 37. Rotary union 45 similarly is connected between the T-fitting and inner end nipple 46, by which sleeve-jacket 37 is fluid-tightly and integrally attached to fluid chamber jacket 28. Sleeve-jacket 37 thereby communicates with chamber 27.

On the other shaft-portion jacket 38, temperature-control fluid leaves it through outlet 47 in stationary T-fitting 48 is similarly mounted between two rotary unions 49 and 50. Rotary union 50 similarly is connected between T-fitting 48 and a second inner end nipple 51, by which shaft-portion jacket 38 is anchored to fluid chamber jacket 28 and communicates with chamber 27.

The rotary unions should be such as stand up under the operating temperatures and pressures. Found to be very effective with this apparatus used as a rotating autoclave is the swivel joint illustrated (in cutaway) on the front cover (page 1) of the OPW Division of Dover Corporation, Cincinnati, Ohio, catalog and again on its page 3 which gives some detail illustrations and description and features of this rotary union. Other illustrations and more information on other models appear on page 9 of that catalog. Its page 2 shows that its models with stainless steel body, as used in this apparatus, are rated for pressures up to 1,000 psi (lbs. per square inch), and those with ductile iron body are rated for up to 600 psi. Its page 12 gives pressure and temperature ranges graphs for them for their different body metals. Its page 15 lists over 200 gases, and inorganic and organic liquids and solutions with which they can be used.

Apparatus 10 is mounted for rotation by rotatably supporting the diametrically opposed sleeve-nipples 46 and 51 in bearings 52 and 53 respectively. However, when the apparatus is of such size or the strength of sleeves 46 and 51 and wall 28 are such that reinforcement is advisable, these sleeves can be reinforced by enclosing each of them in a separate trunion (not shown) snugly fitted over it and with the periphery of the inner end of such trunion welded to jacket wall 28.

It is advantageous also to support the outer end of each shaft part 34 and 35 in a bearing which conveniently can be branch arms 70 and 70a of bearings 52 and 53. A pulley 57 is mounted at the outer end of shaft part 35, and for any larger size and heavier apparatus may be replaced by a sprocket or gear wheel to be driven by a chain belt, for rotating the apparatus.

To distribute uniformly the temperature-control fluid to enable providing overall substantially uniform temperature through the entire treating or reaction chamber wall 12, temperature-control fluid chamber 27 is divided into four substantially similar quadrantal parts or quadrants. First chamber 27 is divided into approximately equal upper and lower halves by annular or peripheral baffle 60 encircling reaction chamber wall 12 and extending from it to temperature-control fluid chamber wall 28 in substantially fluid-tight engagement with them in a plane substantially normally transverse to the central axis of chamber 11 and running substantially through the axis of shaft 33.

In this modification, annular or transverse baffle 60 passes at diametrically opposed locations through corresponding slots 62 and 63 in the inner ends of shaft portions 34 and 35 respectively.

Figure 1:
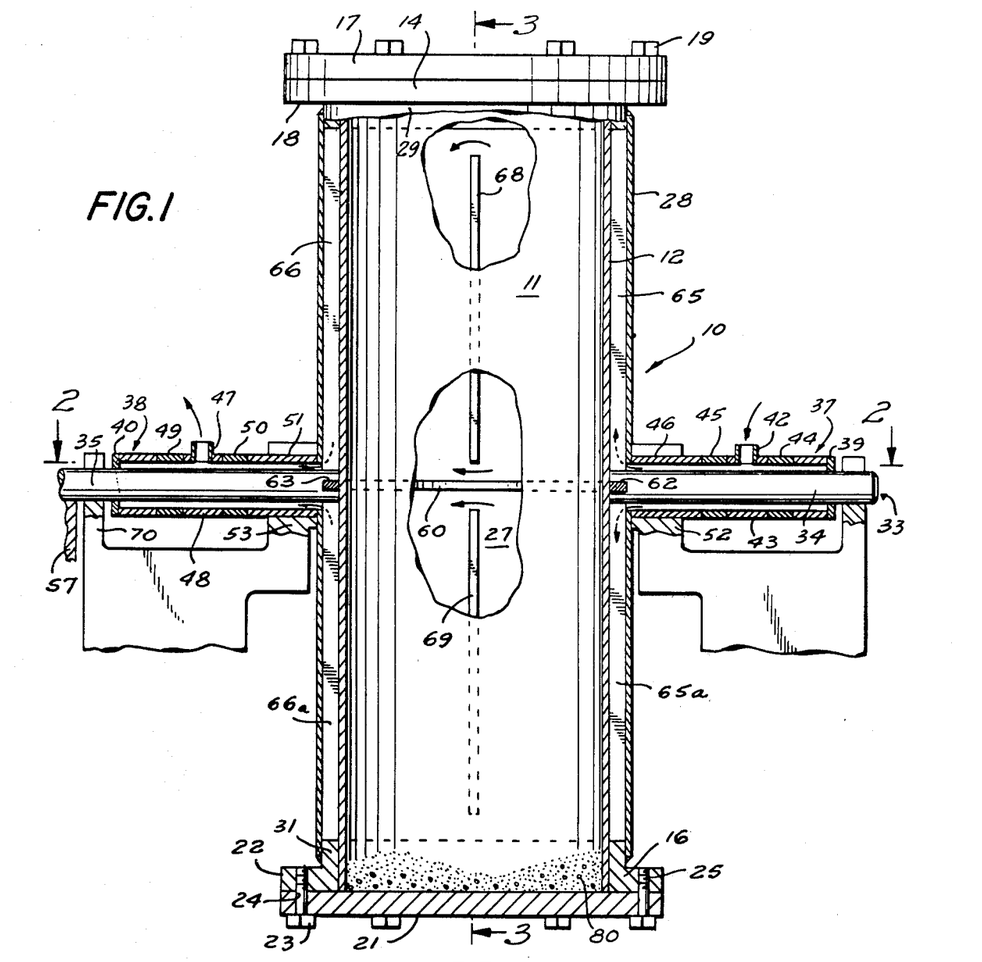
FIG. 1 is a sectional view of one embodiment of the apparatus with the axis of its cylindrical reaction chamber vertical, and taken in a plane through that axis and the axis of the shaft about which the chamber is to be rotated; with parts shown in front elevation and parts of its inner shell or reaction chamber wall broken away to expose baffles in the temperature-control fluid chamber.

Each of these upper and lower halves of temperature-control fluid chamber 27 then separately can be divided into substantially equal parts or quadrants (as seen in FIG. 1) by (i) the vertical divider baffles 65 and 65a extending in substantially fluid-tight engagement with chamber wall 12 and jacket wall 28 and between shaft part 34 and skirts 29 and 31 respectively and (ii) divider baffles 66 and 66a in like engagement between walls 12 and 28 and shaft part 35 and skirts 29 and 31.

Figure 3:
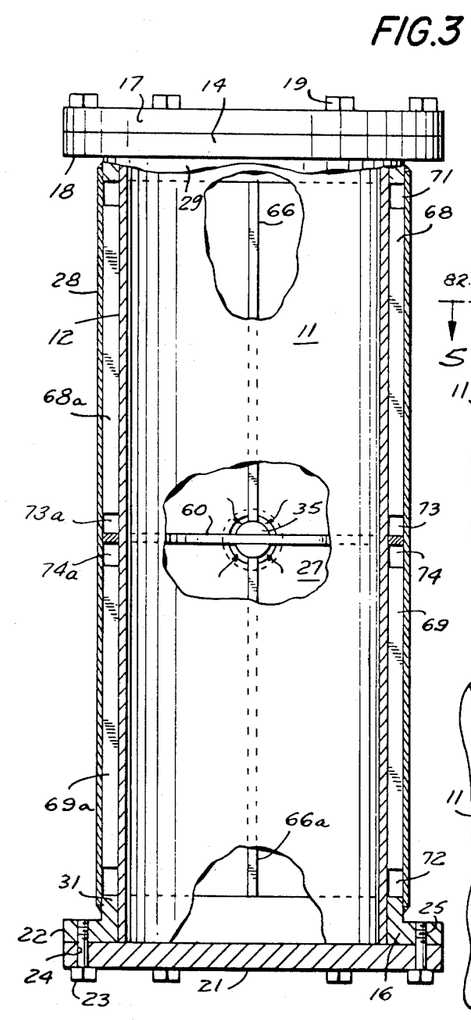
FIG. 3 is a vertical sectional view taken along the line 3—3 of FIG. 1 looking in the direction of the arrows, with parts in side elevation and parts of its inner shell or reaction chamber wall broken away to expose baffles between it and the outer wall or shell.

To provide overall substantially uniform temperature distribution through the entire chamber wall 12, each such quadrantal portion or quadrant of temperature-control fluid chamber 27 includes at least one vertical and outer end shortened flow diverter baffle 68 as in the upper rear quadrant and like baffle 69 as in the lower rear quadrant (both as seen in FIG. 1), to promote serpentine stream flow of fluid separately in each of these quadrants. Each such short diverter baffle, as well as like baffles 68a and 69a (in the upper and lower front quadrants respectively, as seen in FIG. 3), extends also in liquid tight engagement from reactor chamber wall 12 to fluid chamber wall 28.

However, at its outer end (i.e. nearer a cap), each diverter baffle is cut off sufficiently to allow the stream flowing through its quadrant to pass almost completely and so extends, for example, roughly about 20% of the height of its quadrant short of cap 17 to provide a slot-like passage 71 (FIG. 3) through which fluid can pass from one half (in FIG. 1 the right hand half) of the quadrant into its left hand half. The corresponding short diverter baffle 69 provides a corresponding passage 72 (FIG. 3).

To avoid development of air or vapor lock in the innermost corner (near annular baffle 60, FIG. 1 center) when the heating fluid is a liquid, each of short diverter baffles 68 and 69, and also 68a and 69a, terminates about 3 to 4 percent of the quadrant height short of baffle 60 whereby a relatively small gas escape or vent orifice 73 and 74, and also 73a and 74a, respectively is provided at each of such inner, or so-called equatorial, corners. The foregoing percentage figures for shortening the ends of the diverter baffles were used in an autoclave (of the invention) with a 54 inch axis length reaction chamber.

In the modification shown in FIGS. 1–3 and 6 (e.g. of 17 inch inside diameter reaction chamber), the single short diverter baffle, such as 68 and 69, in each quadrant is located at about midway between the full or divider baffles 65 and 66 and 65a and 66a respectively. However, in an apparatus of still larger capacity and thus correspondingly larger diameter, generally a larger odd number of diverter baffles, for example three, will be needed.

In such case, i.e. using three intermediate or diverter baffles, they would be positioned parallel to one another as well as to divider baffles 65 and 66 and at 30° angularly separated locations around the periphery of chamber wall 12. However, with the larger number they should be positioned in staggered relation as to their respective terminations short of divider baffle 60. Thus, the larger or slit-like opening (e.g. 71) will be between the upper end of the first one of the three diverter baffles and the cap, below the lower end of the second one of them and transverse baffle 60, and again between the upper end of the third one of them and the cap; thereby to promote serpentine flow of the temperature-control fluid from its entry at the inner end of shaft part 34 into the quadrant and so on through it to its egress from the quadrant and on into the inner end of the shaft part 35.

FABRICATING THE APPARATUS

Cylindrical reaction chamber wall 12 may be prepared first. Annular baffle 60 then is fitted over wall 12 at its required location and welded in place. Then collars 14 and 16 are fitted over its open outer ends and welded at least around the annular junction of the underside of the collars with the outer surface of wall 12.

The various vertical baffles, e.g. 65, 66, 68, 69, 65a, 66a, 68a and 69a, are welded in place at their respective locations on the exterior of wall 12. Shaft parts 34 and 35 then are placed diametrically opposite one another with their respective slotted ends 62 and 63 fitted over baffle 60, and welded at their junctions with the latter and beyond the inner peripheral end of the shaft parts to the outer surface of wall 12.

Two longitudinal half sections of chamber jacket wall 28 with cut out portions large enough to allow the shaft parts to protrude and jointly to provide circular openings spaced away from their inner ends are set in place around the outer surfaces of upper skirt 29 and lower skirt 31 and welded together along their longitudinal junction points and peripherally at their outer ends around the outer surfaces of skirts 29 and 31.

The inner ends of nipples 46 and 51 are then inserted at their diametrically opposed openings in jacket wall 28 and welded around their peripheral junctions with the outer surface of that wall 28. Rotary unions 45 and 50 then are liquid-tightly connected to the open outer ends of inner nipples 46 and 51 respectively. Then the inner end of each of stationary T-fittings 43 and 48 also is fluid-tightly connected with the outer end of the respective one of those two rotary unions.

The inner ends of rotary unions 44 and 49 then are connected similarly respectively to the outer ends of the T-fittings. Closure caps 39 and 40, then held with the inner end of their skirt portions extended toward rotary unions 44 and 49, are slipped respectively over the outer ends of shaft-parts 34 and 35 to connect the inner ends of these skirt portions fluid-tightly separately to these rotary unions. The periphery of the orifice in the outer end of each cap, through which the outer end of the respective shaft-part still protrudes, then is welded to the shaft-part over their entire junction. Thereby the outer end of each of shaft-part jackets 37 and 38 is fluidtightly sealed.

The thus assembled rotatable reactor-autoclave then is mounted with nipples 46 and 51 of its respectively opposed shaft-part jackets 37 and 38 seated in the pair of opposed bearings 52 and 53, and with the outer end of shaft-part 35 supported in bearing branch arm 70. Pulley 57 then is mounted and secured at the outer end of shaft-part 35 and connected by suitable belt to a driving source. Alternatively, pulley 57 may be replaced by a sprocket or gear wheel and connected by chain belt to a corresponding driving source.

In addition to their effect on the course of the temperature-control fluid through temperature-control chamber 27, the various baffles advantageously strengthen not only that chamber but also the entire body portion of the end over end rotatable materials-treating apparatus.

Continuous transverse baffle 60 and its connection with the separate shaft-parts is beneficial in the end over end rotation. Additional benefit in stabilizing the rotation stems from the support given to the pulley end of shaft-part 35 by branch arm 70 of bearing 53, and also by the support to shaft-part 34 by the corresponding branch 70a of bearing 52.

The embodiment of FIGS. 1–3, used in the shortly below illustrative examples of use of the apparatus, has a reaction chamber volume of about 58 gallons, one inch separation between walls 12 and 28; one-half inch thickness of baffles and of wall 12, one inch vent gap between transverse baffle 60 and the diverter baffles and four inch long slip-gap passage between them and the inner end of the skirt of the collars; two inch diameter shaft-parts, two and three-quarters inches inside diameter of their sleeve-jackets, one-half inch thickness of the jacket walls and one-quarter inch for wall 28. The closure caps are two inches thick to withstand 500 psi, and the bolt shanks have one and a quarter inch diameter.

OPERATION OF APPARATUS

The apparatus of the invention enables conducting under selected temperature conditions and with agitation a chemical operation which includes agitating a liquid phase and under selected temperature conditions, by enclosing whatever starting materials are involved in said operation in a liquid-tightly enclosed cylindrical operating zone by a liquid-tightly closeable zone-enclosure which enclosure is a heat conductor and has a greater axial length than diameter and is substantially completely enveloped by a temperature-control fluid-confining zone divided into a plurality of substantially equal control-fluid zonal parts; and agitating said operating zone contents by rotating said enclosed operating zone jointly with said fluid-confining zone end over end about an axis substantially perpendicular to and intersecting its longitudinal axis generally about midway between its ends, while running temperature-control fluid separately through each of said zonal parts under substantially identical flow pattern to provide substantially uniform overall indirect heat transfer between said fluid and said operating zone contents.

This apparatus is applicable to any type of chemical operation including agitating a liquid phase under selected temperature conditions, whether the operation is merely a single step operation such as acting on one or more chemical substances, or a polymerization, or a step in a multi-step chemical procedure, for example, a chemical reaction between a plurality of substances or dissolving or otherwise dispersing one or more substances in a solvent or in a liquid vehicle as by use of some surfactant or emulsifying agent, or impregnation of a fluid (gas, vapor, or liquid) into a soft or hard solid substance, or solvent extraction or removal of a surface coating.

EXAMPLE 1

A suitable circular gasket was placed over the annular portion of cap 21 and both were liquid-tightly bolted to flange 22. Reaction chamber 11 (54 inches length and 17 inches inside diameter) was charged with the following materials in parts by weight to fill the chamber to about its full capacity:

| | |
|---|---|
| styrene monomer | 40 parts |
| stearyl methacrylate | 3 parts |
| isobutyl methacrylate | 8 parts |
| ethyl acrylate | 3 parts |
| '360' aliphatic solvent | 30 parts |
| diacetone alcohol | 5 parts |
| 4-methoxy-4-methyl-pentanone-2 | 5 parts |
| 'Cyclosol No. 53' (Shell Oil Co.) | 5 parts |
| azo-bis-isobutyronitrile | 0.6 part |
| benzoyl peroxide | 0.2 part |
| trinonyl phosphite | 0.1 part |
| di-tertiary-butyl catechol | 0.1 part |

Top cap 17 together with a suitable gasket was liquid-tightly bolted to collar 14.

Hot water from a water heater was fed through a connecting hose (not shown) to inlet branch 42 of T-fitting 43 at a temperature to provide to the reaction chamber contents a temperature of 155° F., with the reactor rotating at 3.5 revolutions per minute. The water flowed through shaft-part sleeve 37 around shaft part 34 to the ingress to temperature-control liquid chamber 27 at the inner end of nipple 46. There it divided into four separate streams, one flowing into each of the four different quadrants of chamber 27 wherein each stream followed in its quadrant a course such as that now to be described in relation to the upper quadrant of the apparatus as viewed in FIG. 1.

The bulk of the hot water flowed inwardly along the upper surface of baffle 60 and upwardly between the opposed surfaces of divider baffle 65 and diverter baffle 68 and then flowed around the outer end of baffle 68 through passage 71 and into and through the portion of that quadrant between the opposed surfaces of diverter baffle 68 and divider baffle 66.

At the same time, a considerably smaller portion of the water in the initial part of the quadrant ran transversely and in part along the surface of transverse baffle 60 and on through escape orifice 73 into the second part of the quadrant, and there mingled with the water flowing toward baffle 60, and then out with it into the discharge space between shaft part 35 and sleeve 38, and out through outlet branch 47 of T-fitting 48 and through a connecting discharge return flow hose to the water heater (both not shown).

As the apparatus was rotating during this just described flow pattern of the heating water through the upper quadrant of the apparatus (as seen in FIG. 1), each of the other three streams of the incoming heating water flowing at the same time into its respective one of the other three quadrants followed a like pattern through the two separate parts of its quadrant, and on to discharge from it about the inner end of shaft part 35, through the discharge passage around that shaft part to outlet branch 47 of T-fitting 48 and on to the water heater.

Rotation of the reactor continued at the same rate as the hot water was supplied to maintain the reaction contents at 155° F. for 16 hours. Then the water was shut off and the rotation stopped. With the apparatus in upright position, a release valve (not shown) in the top cap was opened sufficiently (to a crack) to allow entry of air. Opening a discharge valve (not shown) in the bottom cap allowed the completed reaction mixture to run out into suitable containers.

The product is a valuable resin polymer solution compatibly mixable in about one to one ratio with currently used drying oils such as tung oil and the like, singly or admixed, in the so-called over-coat varnish formulations to provide such an over-coat varnish to be applied over colored printing on papers such as on label papers. When dry, by evaporation of its solvents, this resin coating leaves over the paper a high gloss, adherent coating transparent to the various colored label printing.

EXAMPLE 2

Pigmented Suspension

The shortly above-described operation was repeated with the following changes:

The respective parts of each of the styrene monomer, stearyl methacrylate, isobutyl methacrylate, and ethyl acrylate were cut in half and the omitted quantities replaced by 27 parts of titanium oxide pigment by weight. Before charging the various chemical substances into the apparatus, a layer of ball mill flint pebbles (about three-quarter inch diameter size) were loaded into it to a depth of about 6 inches.

The operation then was repeated as described above with end over end rotation for 12 hours. The product obtained at the end of that time was a very stable coating composition with exceptional spreadability, hiding power and covering; excellent adhesion, advantageous salt-spray resistance, and unusual dispersion in spite of its being ready for use without having been subjected to any kind of paint grinding mill treatment.

MODIFICATIONS OF APPARATUS

Figure 6:
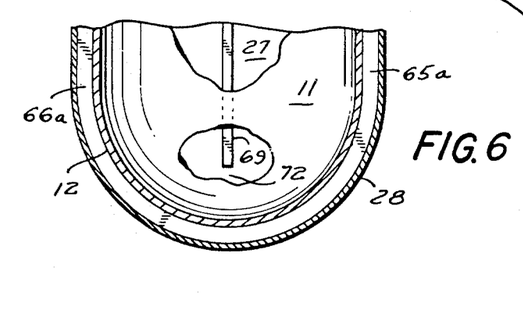
FIG. 6 is a fragmentary vertical section of the lower end of a modified form of the apparatus of FIG. 1, with parts of the reaction chamber wall broken away to show the baffle in that part of the heating chamber.

Instead of constructing the rotatable ball mill autoclave with a collar and removable cap at each end (as in FIGS. 1-3), it is built with each of reaction chamber wall 12 and temperature-control fluid chamber wall 28 respectively having an integral rounded head as shown in FIG. 6. In this modification, the respective members of each of the pairs of vertical divider baffles 65 and 66 and 65a and 66a are continuous and unitary with one another in each pair. However, each of the diverter baffles, as 68, 69, 68a and 69a still has its outer end spaced away from the continuous divider baffle to retain the slot-shaped passages 71 and 72, and also is spaced away from baffle 60 to provide the escape orifices 73 and 74; and if each quadrant has more than one diverter baffle, they are staggered as earlier described to provide serpentine flow.

Both ends of the rotary autoclave can be made with such integral dished head at the outer ends of reactor chamber wall 12 as well as of chamber jacket wall 28. Also, the jacketed head at either end or both ends can be made with an openable or removable liquid-tightly closeable manhole (not shown), and with a pressure release valve as well as a safety valve and/or a liquid or free-flowing finely divided solids inlet valve and corresponding liquid or fluid mixture outlet valve in the other head.

In some uses of the rotatable autoclave and/or ball mill of the invention, it may be necessary during the operation at high pressure and while rotating, to feed into the reaction chamber an additional reactant at some particular stage of the operation. That can be done by modifying one of the shaft parts, for example, 34 (as in FIG. 4), by providing in it a liquid passage bore 75 extending co-axially centrally through it from its outer end to, and with its inner end extending through and terminating at, the inner surface of the reaction chamber wall 12 to communicate with chamber 11.

Figure 4:
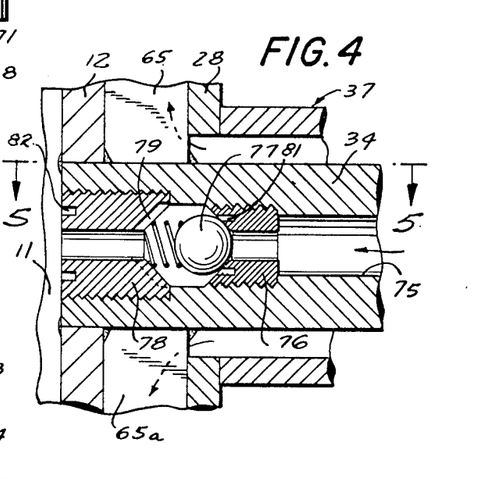
FIG. 4 is a fragmentary vertical sectional view showing the inner end of a modified form a jacketed shaft with an axially central bore running through it to serve as a fluid materials conduit communicating with the interior of the reaction chamber.
Figure 5:
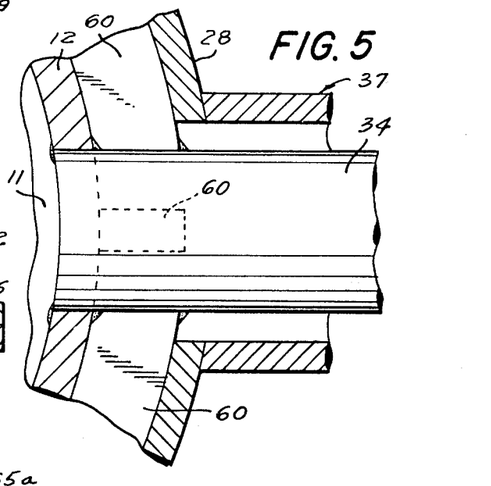
FIG. 5 is a fragmentary partially sectional view taken along line 5—5 of FIG. 4 looking in the direction of the arrows, and with the central bore and parts of the valve within its inner end not shown.

In that case, the bore terminates at its outer end in a fitting pressure-tightly connected with a rotary, i.e., rotatable union or joint connected to a feed line bringing in under pressure the reagent to be added. The inner end of bore 75 is fitted with a ball check valve with its valve seat 76, sealing ball 77 biased against the spring and so on valve nut 78 having one or more sluice-ways 79 inclining inwardly into the inlet end of bore 75, through which the reactant can enter reaction chamber 11.

Upon supplying the reagent under a pressure greater than that in chamber 11 thereby ball 77 is forced away from its sent to compress the spring and allow the reactant to pass on into the reaction chamber. When the needed quantity of reactant has been added, closing a feed valve (not shown) in its supply line and opening a release valve (not shown) between the feed valve and bore 75 allows ball 77 to be forced back by the spring as well as the pressure in reaction chamber 11 to its seat to close the ball check valve.

Tool-engaging slots 81 and 82, in valve seat 76 and valve nut 78 respectively, enable engaging and removing each of them with a tool for that use to allow cleaning out the check valve and, when necessary, bore 75.

The means for feeding temperature-control fluid to, and for its egress from, the separate compartments of the temperature-control fluid chamber of the embodiment of FIGS. 1-3, 5 and 6 can be modified by replacing shaft part 34 and its surrounding temperature-control sleeve 37 simply by the advantageous combination of a hollow shaft part 91 and a rotary (i.e., rotatable) joint 92 (as in FIGS. 7 and 9), and doing likewise as to shaft part 35 and its sleeve 38. As each such replacement is the same as the other, their details can be described by reference to one of them as shown in those figures.

Figures 7, 8:
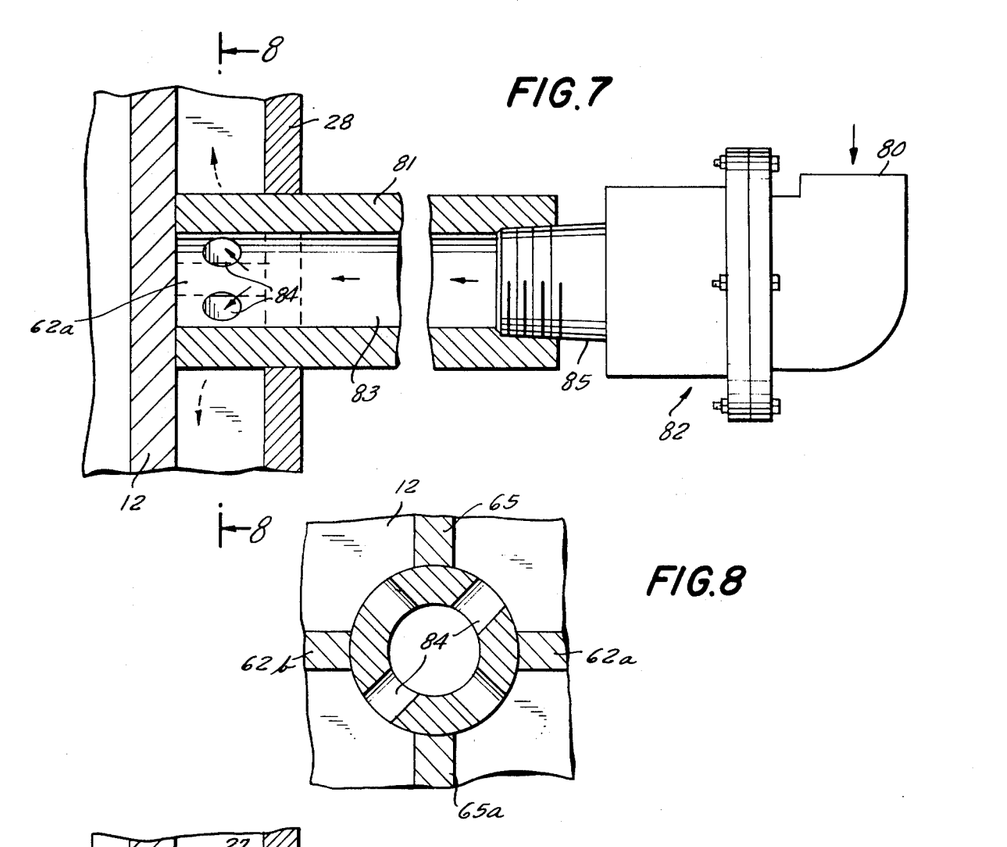
FIG. 7 is a fragmentary vertical section through one side of the shaft and its contiguous part of heat-control fluid jacket, showing another embodiment having a heat-control fluid conduit running through the shaft.
FIG. 8 is a vertical section along the line 8—8 of FIG. 7, looking in the direction of the arrows.
Figure 9:
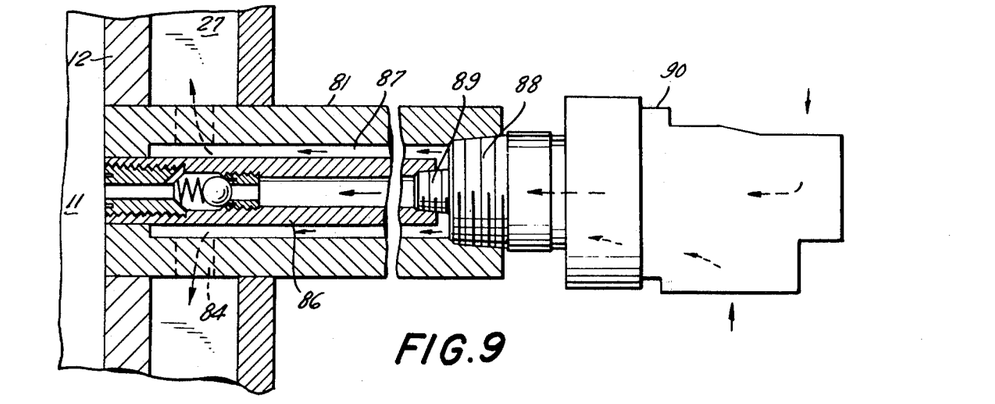
FIG. 9 is a view like FIG. 7 and including a fluid material conduit concentrically running through the heat-control fluid conduit and communicating with the interior of the reaction chamber.

In them, the inner end of hollow shaft part 91 extends snugly through a peripherally fitting opening in fluid chamber wall 28 to, and is integrally attached (as by welding) to, the outer surface of reaction chamber wall 12. Wall 28 is fluid-tightly sealed (as by welding) around its peripheral contact with shaft part 91. The latter is hollow by having a central bore 83 (e.g., of 1 inch diameter in a 2 inch diameter shaft) extending longitudinally coaxially through it from its outer end to its inner end part within chamber 27.

There bore 83 communicates with each quadrant of chamber 27 through a suitably sized circular orifice 84 (e.g., 0.5 inch diameter) to enable the respective portion of the temperature-control fluid to flow into its own quadrant. The central axis of each of such four orifices can lie on a line 45° from the vertical. The inner end of each shaft part can be slotted as at 62 and 63 of FIG. 1, or can terminate butt end against wall 12 with the peripheral baffle 60 cut into two separate parts 62a and 62b (as seen in FIG. 8).

The outer end of bore 83 is threaded to receive in fluid-tight registry the external threads at the outer end of the bore-engaging nipple 85 of rotary joint 92 whose fluid intake 80 is connected (in manner similar to fluid inlet 42 of T-fitting 43 of FIG. 1).

In manner similar to that described for the temperature-control fluid flow through the embodiment shown in FIG. 1, the fluid leaving chamber 27 enters the corresponding orifices into the bore of a diametrically opposed like combination of hollow shaft part and rotary joint and leaves its fluid outlet, for example, to return to a fluid heater.

Any suitable fluid-tight rotary joint 92 can be used such as that available over the past 15 years as the Phillips EXACTO flexible rotary joint, packless and self-lubricated, produced by Phillips Company, Inc., of Ridgefield, New Jersey, and shown in gray on the front of their single sheet two page technical description (with red background for the upper half of its front page and black for its lower half).

The hollow shaft parts of FIGS. 7 and 8 can be combined with means as shown in FIG. 4 for feeding fluid material into reaction chamber 11. Such combination is illustrated in FIG. 9. In it a fluid materials conduit 86 extends longitudinally coaxially through, and spaced away from the inner wall of hollow shaft part 91, to leave a temperature-control fluid passage 87 between them.

Fluid materials conduit 86, fitted at its inner end with a ball check valve of the same construction and operation as that shown in FIG. 4 and described earlier above, similarly communicates (FIG. 9 with similarly numbered parts as in FIG. 4) with reaction chamber 11 to allow charging fluid material into it during the materials-treating operation therein. The inner wall of the outer end of each of hollow shaft part 91 and fluid materials conduit 86 is threaded to engage respectively in fluid-tight and pressure-tight registry with corresponding concentric engaging nipples 88 and 89 of concentrically-dual-flow rotary joint 90 (shown without more detail in FIG. 9 because its details are not part of the invention).

A suitable concentrically-dual-flow rotary joint effective in the foregoing combination is seen in catalog No. 14 of Rotherm Engineering Company, Inc., of Chicago, Illinois, such as its type YX of its pages 1-2 or type AR on its page 3. The temperature-control fluid enters through the inlet for it into fluid passage 87 and on through it and orifices 84 and heat control chamber 27 and so on out of the outlets from its quadrants and through like orifices 84 into a second egress combination such as that of FIG. 9 and through its temperature-control fluid egress passage and on out through the outlet for it in the rotary joint.

In this second combination, the ball check valve in the inner end of the equivalent of the fluid materials conduit is modified so that the ball seat is between the ball and reaction chamber 11 and the spring is next beyond the ball in a direction away from the chamber.

Thereby that conduit enables withdrawing reaction material from reactor chamber 11 at any point during the reaction period from the second outlet of the concentrically-dual-flow rotary joint, by proper sequential operation of hand operated valves (not shown) exterior of that second outlet.

The apparatus of the invention can be made of ordinary high pressure-withstanding steel for all of its uses except those where contact with steel and any of its constituents at the operating temperature and conditions adversely affects the reaction products. For such uses reaction chamber wall 12 and the caps, whether removable or integral, can be made of stainless steel or be lined with it or some other suitable metal which does not adversely affect the materials being treated.

While the temperature-control fluid chamber of the fully described illustrative embodiment of the end over end rotatable reactor of the invention advantageously is divided into four similar quadrants, the apparatus can be made with some other plurality of, even two, such substantially alike divisions or compartments of the control fluid chamber, so long as there is the same number of them above and below transverse or annular baffle 60, and an adequate arrangement of diverter baffles is used.

For example, such reactor apparatus with only two like temperature-control fluid chambers lacks the vertical baffles 65, 65a, 66 and 66a, but includes the diverter baffles 68, 68a, 69 and 69a.

It is advantageous as to the empty but closed apparatus, that its two halves resulting from dividing it by a plane running through the axis of its end over end rotation and the middle (of the thickness) of annular transverse baffle 60 be substantially equal in weight.

GRINDING USE IN REACTOR, AND VARYING TEMPERATURE

Many reactions using the apparatus as an autoclave can be carried out without including any ball mill-type metal balls or flint pebbles or stones such as used in Example 2 above, showing preparation of a pigmented polymer resin solution. While many reactions thus can be carried out without them, including grinding balls or flints is highly beneficial and advantageous where disaggregated solid materials are used, for example, for dispersing them in solvent or other liquid vehicles.

The result is that such solid materials then not only readily are more finely divided so that they more readily are dissolved if they are soluble and need to be dissolved in the vehicle, or are more readily and very stably dispersed in the vehicle if insoluble in it; and that occurs unexpectedly in an inordinately shorter time than is possible in a ball mill rotating its usual longitudinally central axis or in grinding mills.

After conducting any operation in the apparatus at elevated temperature, and so also at elevated pressure, or if a reaction requires cooling at some intermediate stage, the hot water or oil or steam supply to the temperature control fluid inlet 42 can be replaced by feeding cooling or cold water to it. That is done by suitable valve adjustments (not shown) ahead of inlet 42 to enable swiching from the hot fluid supply source to the cooling or cold water supply source. In that way after completing a run, the pressure in the reaction can be reduced to a suitable lower level or retained at some adequate level, for example, if desired to assist in discharging the contents which in turn can be cooled to any desired discharge temperature.

Such possibility of cooling the reaction chamber is further advantageous by enabling using the apparatus as a ball mill for disintegrating and finely dividing materials which cannot be treated thus at ambient temperatures, but which are suitably frangible and non-adherent when cooled to some adequate temperature below ambient.

While the pigmented suspension in Example 2 shows the reduction in size of its titanium dioxide pigment, that same pigment likewise can be reduced in size in other polymerization systems or other liquid systems. Other pigments likewise can be reduced in size in that specific or other polymerization systems or other liquid systems. Other solid particles in fluid systems, for example, solid adsorbing agents such as carbon black, or catalyst particles, similarly can be reduced in size either to provide additional contact surface or to present fresh surfaces such as fresh catalyst surfaces during the course of a catalyzed reaction.

Use of the apparatus in an impregnation is illustrated by, but not restricted to, the following example:

EXAMPLE 3

Figure 2:
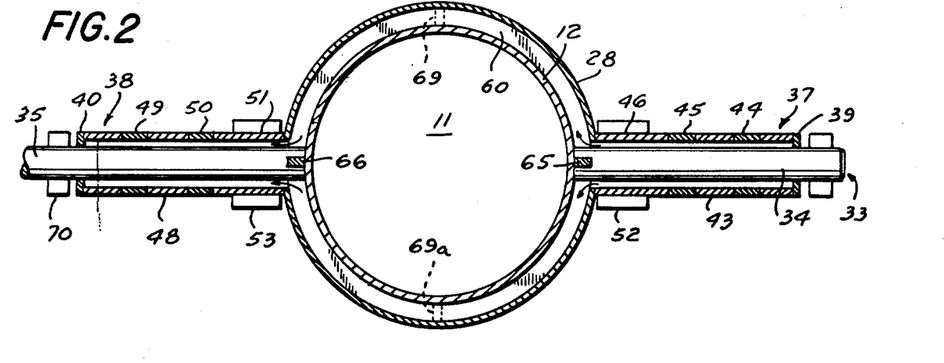
FIG. 2 is a horizontal sectional view taken normally transverse to the central axis of FIG. 1 and along line 2—2 looking in the direction of the arrows.

Impregnation of Polystyrene Pellets to provide Expandable Polystyrene 46 gallons (391 pounds) of water were charged into a 58 gallon stainless steel reactor apparatus as shown in FIGS. 1, 2 and 3 (having a longitudinal axis about three times its diameter). To the water there was added one pound of the "Gafac RE 610" anionic emulsifying agent, a phosphate ester of an ethoxylated alkyl phenol and composed of about equal parts of the mono- and di-ester and a maximum of up to 5% of nonionic component (product of General Aniline & Film Corporation, New York, N.Y., according to their patents 3,004,056 and 3,004,057); and a catalytic redox mixture of 25 grams of potassium persulfate and 10 grams of sodium bisulfite, with which mixture was included 10 grams of sodium pyrophosphate.

Into that aqueous mixture there was charged 100 pounds of general purpose molding polystyrene pellets (3 millimeters size). More water was added to adjust the liquid level to leave sufficient room only for the addition of 7 pounds of pentane, so that upon adding it the vessel was full to capacity. The impregnator then was pressure-tightly sealed by tightly bolting on its flat top cap over an intermediate gasket resistant to those liquids and their vapors.

The impregnator then was rotated at 4 r.p.m. (thereby agitating the polystyrene pellets) while hot water was circulated through the impregnator jacket to bring the temperature of the contents to 195° F. The heating was continued to keep the contents at that temperature for about 30 minutes. Then cooling water was circulated through the jacket to lower the temperature of the contents rapidly to about 100° F.

Rotation then was stopped, the impregnator opened and its contents discharged through a screen to let the water drain off, leaving behind the wholly free running, non-agglomerated pentane-impregnated pellets. These were rinsed lightly with tepid water to remove merely the water-soluble substances in the adhering suspending water, and then were air draft dried.

Any other styrene-polymer can be impregnated similarly, as can also any other plastic or other material that is to be impregnated or leached and which physically can be handled in the reactor apparatus of the invention. The removable cap embodiment (FIGS. 1–3) of the invention is advantageous particularly for treating large bulky materials.

The apparatus of the invention can be used in carrying out any other chemical operation, whether a chemical treatment or reaction, that has to be agitated under selected temperature conditions and at ambient atmospheric or other pressure. That is so also whether the treatment is to be carried out in solution form or in emulsion or liquid suspension vehicle or reaction medium, or whether including disintegrating and/or finely dividing in a liquid system a frangible material such as adsorbing agents, catalysts, liquid-soluble dye-stuffs, and insoluble pigments. Chemical synthesis is included in chemical reaction. The expression "chemical operation" is used generically to embrace all of these various treatments or reactions as described in this disclosure.

By "body portion" of the apparatus is meant that part of it excluding the closure caps and any part of the collars exposed outside of wall 28 of the embodiment of FIGS. 1–3 and all of the embodiments represented by them when modified by the dished end of FIG. 6 excluding any valves in any manhole covers.

Various other substitutions and modifications can be made in any of the hereinabove described apparatus embodiments of the invention and individual parts of it, within the scope of the appended claims, and which are intended also to cover equivalents of any of the specific embodiments.

What is claimed is:

1. An apparatus effective for treating materials under selected temperature conditions and with agitation, which comprises:
   a. a liquid-tightly closeable tubular materials-treating chamber,
   b. a temperature-control fluid jacket spaced away from and enclosing at least substantially its overall body portion thereby to provide a temperature-control fluid chamber enclosing said body portion,
   c. divider means within said control fluid chamber and extending in at least substantially liquid-tight engagement with its wall and that of said treating chamber and dividing said control fluid chamber into a plurality of substantially equal control fluid compartments, said divider means comprising an annular divider member in like liquid-tight engagement and lying in a plane substantially normally transverse to the central axis of said chamber;
   d. means to enable rotating the tubular jacketed treating chamber end over end about an axis lying substantially in said plane and also substantially normally transverse to said central axis;
   e. temperature-control fluid ingress means to enable feeding said fluid to about the correspondingly same inlet location of each said compartment and while the treating chamber is being thus rotated;
   f. control fluid egress means at about the correspondingly same outlet location of each said compartment to enable discharging heat-control fluid from said compartments while said chamber is being rotated; and
   g. flowing fluid diverter means in each said compartment intermediate its fluid ingress and egress ends to affect the flow course of fluids through it to enable providing substantially overall uniform heat transfer through the wall separating said two chambers.

2. Apparatus as claimed in claim 1, wherein the control fluid chamber is divided into four substantially identical quadrants of a pair of longitudinal dividers positioned diametrically opposed to one another, each in its own separate line normally transverse to the said annular divider, with fluid ingress means to each quadrant being located adjacent the intersection of one of said lines with said annular divider, and the fluid egress means of each quadrant located adjacent the other such intersection; and each said longitudinal divider extends in at least substantially liquid-tight engagement between said walls and the outer ends of the fluid control chamber.

3. Apparatus as claimed in claim 2, wherein each compartment has an odd number of flowing fluid diverters, each of which is positioned substantially parallel to said longitudinal dividers and the inner end of each odd numbered diverter is spaced away from the annular divider a sufficiently short distance to provide an escape-vent for any gas or vapor which reaches that location for it to be carried along through said vent with a bleeder stream of the control fluid, and the outer end of each said diverter is spaced away from the outer end of the control fluid chamber to provide a passage to allow the rest of the stream of such fluid to flow therethrough to about its almost full rate of flow through the quadrant; and each of any even numbered diverter is correspondingly oppositely spaced away from the annular divider and the outer end of said chamber; thereby to cause the temperature-control fluid to follow a serpentine flow path through the quadrant.

4. Apparatus as claimed in claim 1, wherein at least one end of the treatment chamber has an open neck and a closure cap which can be tightly secured about the neck by closing means that enable at least liquid-tightly securing said cap to said neck.

5. Apparatus as claimed in claim 2, wherein said means to enable rotating said jacketed chamber comprises a pair of diametrically opposed shaft-parts co-axially aligned along said axis of rotation, with each of them having its inner end fixedly connected to the wall of said treating chamber and extending outwardly therefrom and through and beyond the outer wall of the temperature-control fluid chamber and in fluid-tight engagement therewith.

6. Apparatus as claimed in claim 5, wherein the means to enable rotating said jacketed chamber comprises
   i. a pair of shaft-part jackets extending outwardly from said control fluid jacket with each separately concentrically surrounding its respective one of said shaft-parts and fluid-tightly communicating at is inner end with the control fluid chamber at its respective one of diametrically opposed apertures thereof therein, and having in its outer end an axially transverse aperture through which the outer end of said shaft extends in fluid-tight engagement therewith.

7. Apparatus as claimed in claim 6, wherein: the inner end of each shaft-part jacket is a short nipple-sleeve extending outwardly from said control-liquid jacket and the outer end of each shaft-part jacket is a closure cap with an integral peripheral skirt extending inwardly toward said sleeve; and the portion between said nipple-sleeve and cap-skirt comprises two rotating unions flanking and in at least liquid-tight communication with the opposite open ends of the cross-member of a T-fitting, with the second opening of one of the rotary unions being at least liquid-tightly connected to the cap-skirt and the second opening of the other rotary union being similarly connected to the outer end of the nipple-skirt, and the open end of the leg of the T-fitting of one shaft-part jacket is adapted to be at least liquid-tightly connected with a source of temperature-control liquid, and the inner end of the nipple-skirt communicates with the ingress means of each of the temperature-control fluid chambers in a manner to enable providing each of them with substantially equal feed of temperature-control fluid; and the inner end of the nipple-skirt of the second-shaft-part jacket communicates with the fluid egress end of each of said control fluid chambers, and the open end of the leg of the T-fitting in said second jacket is adapted to serve as a discharge outlet for said fluid from said chambers to be disposed of as desired.

8. Apparatus as claimed in claim 7, wherein one of the shaft parts has a longitudinally co-axial bore extending from one end of it to the other, the outer end of the bore being connected in at least liquid-tight engagement to a rotary joint, and the other end of the bore communicating with the interior of the treating chamber, and in that other end a ball check valve arranged with its ball between its seat and the nut, and the nut being located at the outer end communicating with said chamber whereby pressure from within it forces the ball against the seat to close the valve and greater pressure from without forces the ball away from the seat to open the valve; and sluice-ways about the rim of the inner end of the nut to enable fluid to flow past it into said chamber.

9. Apparatus as claimed in claim 5, wherein at least one of said shaft-parts has a longitudinally co-axial bore extending through it, the inner end of said one shaft-part extending through and being in liquid-tight engagement with, the outer wall of the temperature control fluid chamber and fixedly attached to the inner wall thereof, a plurality of orifices in said inner end of said one shaft and communicating with said co-axial bore to provide a separate one of said orifices in communication respectively with each separate compartment of said control fluid chamber; and a rotary joint equipped with a fluid intake, being connected in fluid flow communication with the outer end of said bore, thereby to enable fluid to enter said intake and flow through said joint and bore and orifices into said compartments.

10. Apparatus as claimed in claim 9, wherein a similar co-axial bore extends through the other shaft part and its inner end has a similar plurality of apertures whereby each compartment of said fluid control chamber is in communication with said bore through a respectively separate one of said apertures, and a rotary joint having a fluid outlet is connected to the outer end of said bore, whereby fluid leaving said compartments flows through said apertures into and through said bore and said rotary joint and out through its outlet.

11. Apparatus as claimed in claim 9, wherein a conduit extends co-axially through said bore and spaced away from its surrounding wall, and the outer end of said bore is in fluid-tight engagement with the engaging end of the outer engaging-nipple of a dual-flow rotary joint, and the outer end of said conduit is in at least fluid-tight engagement with the engaging end of the outer engaging-nipple of said rotary joint, and the inner end of said conduit communicates in at least fluid-tight engagement with the material-treating chamber and has a ball check valve arranged with its ball between its seat and nut, and the nut being located at the outer end communicating with said chamber whereby pressure from within it forces the ball against the seat to close the valve and greater pressure from without forces the ball away from the seat to open the valve, and sluice-ways about the rim of the inner end of the nut to enable fluid to flow past it into said chamber; said rotary joint having one intake to enable temperature-control fluid to enter it and flow through the annular passage between said outer and inner nipples and between said bore and said conduit and through said orifices into said control fluid chamber; said rotary joint having a second intake to enable fluid material to enter it and flow through said inner nipple into said conduit and open said ball valve and discharge into the treatment chamber.

12. Apparatus as claimed in claim 11, wherein a similar co-axial bore extends through the other shaft-part, and a similar plurality of orifices in its inner end provides communication between said bore and the diametrically opposed end of each of the compartments of said fluid control chamber, and a similar conduit similarly extends co-axially through said other bore, and the outer end of said other bore is in fluid-tight engagement with the engaging end of the outer engaging nipple of another dual-flow rotary joint; and the inner end of said conduit communicates in at least fluid-tight engagement with the material-treating chamber and has a ball check valve arranged with its ball between its seat and nut, and the seat being located at the end communicating with said chamber whereby pressure on it by a spring plus the pressure developed in the zone between the spring and the closed outer valve forces the ball against the seat to close the valve and the reduced pressure resulting when an outer valve exterior of said second rotary joint is opened allows the pressure from within the treating chamber to overcome the spring pressure and propel material out from said chamber through said conduit and the inner nipple o said rotary joint connected in at least fluid-tight engagement with the outer end of said conduit and through said joint and out through said valve; said rotary joint having a second outlet communicating with said valve.

13. Apparatus as claimed in claim 1, wherein said apparatus contains a sufficient number of ordinary ball mill stones or metal balls to enable the end over end rotation of the treating-chamber to cause the apparatus significantly to reduce the size of solid materials charged inot its said chamber.

* * * * *